United States Patent [19]

Breidenbach et al.

[11] Patent Number: 4,518,729

[45] Date of Patent: May 21, 1985

[54] SOLUTIONS OF ISOCYANATO-ISOCYANURATES IN PLASTICIZERS FOR POLYVINYL CHLORIDE, A PROCESS FOR THEIR PRODUCTION AND THEIR USE AS ADHESION-IMPROVING ADDITIVES IN COATING COMPOSITIONS BASED ON PLASTICIZED POLYVINYL CHLORIDE

[75] Inventors: Peter Breidenbach, Cologne; Helmut Hurnik, Leverkusen; Josef Pedain, Cologne, all of Fed. Rep. of Germany

[73] Assignee: Bayer Aktiengesellschaft, Leverkusen, Fed. Rep. of Germany

[21] Appl. No.: 313,842

[22] Filed: Oct. 22, 1981

[30] Foreign Application Priority Data

Nov. 5, 1980 [DE] Fed. Rep. of Germany ....... 3041732

[51] Int. Cl.³ ................................. C08K 5/34
[52] U.S. Cl. ................................. 524/101; 156/331.4; 156/331.7; 524/197; 525/375
[58] Field of Search ...................... 524/101, 196, 197; 525/375; 156/331.4, 331.7

[56] References Cited

U.S. PATENT DOCUMENTS

| | | | |
|---|---|---|---|
| 3,454,533 | 7/1969 | Kerrigan | 156/331.4 |
| 3,870,665 | 3/1975 | Diehr | 156/331.4 |
| 4,115,373 | 9/1978 | Henes et al. | 528/48 |
| 4,246,132 | 1/1981 | Rainer et al. | 252/182 |
| 4,288,586 | 9/1981 | Bock et al. | 528/67 |
| 4,306,051 | 12/1981 | Rainer et al. | 528/45 |

FOREIGN PATENT DOCUMENTS 294997 5/1968 Austria .
1669161 1/1966 Fed. Rep. of Germany .
1455701 11/1976 United Kingdom .

OTHER PUBLICATIONS

Soviet Inventions Illustrated, Section CH, Week B24 (Jul. 25, 1979), Derwent Publications Ltd., A25, SU-61-9-490 (Korshak).
Kunststoffe 68, 1978, pp. 735 et seq.
Kunststoffe 68, 1978, pp. 800 et seq.

Primary Examiner—Paul R. Michl
Attorney, Agent, or Firm—Gene Harsh; Joseph C. Gil; Thomas W. Roy

[57] ABSTRACT

The present invention relates to solutions of isocyanato-isocyanurates based on mixtures of (i) 2,4- and/or 2,6-diisocyanato-toluene and (ii) 2,2'-, 2,4'- and/or 4,4'-diisocyanato-diphenyl methane in a molar ratio of (i) to (ii) of about 5:1 to 1:3, in plasticizers for polyvinyl chloride wherein the isocyanato-isocyanurates comprise about 1 to 50% by weight of the solution. The present invention also relates to a process for preparing these solutions which comprise partially trimerizing the isocyanate groups of the above diisocyanates using catalysts which accelerate the trimerization of isocyanate groups, the reaction either being conducted in the presence of plasticizers for polyvinyl chloride or the reaction product being dissolved in a plasticizer of this type, optionally after the separation of excess, unreacted diisocyanate.

In addition, the present invention relates to the use of these solutions as adhesion-improving additives for coating compositions based on polyvinyl chloride. Besides improved adhesion, these compositions also demonstrate improved resistance to discoloration during thermal processing.

5 Claims, No Drawings

SOLUTIONS OF ISOCYANATO-ISOCYANURATES IN PLASTICIZERS FOR POLYVINYL CHLORIDE, A PROCESS FOR THEIR PRODUCTION AND THEIR USE AS ADHESION-IMPROVING ADDITIVES IN COATING COMPOSITIONS BASED ON PLASTICIZED POLYVINYL CHLORIDE

BACKGROUND OF THE INVENTION

1. Field of the Invention

This invention relates to new solutions of isocyanato-isocyanurates in plasticizers for polyvinyl chloride, to a process for producing these solutions by trimerizing some of the isocyanate groups in the diisocyanates on which the isocyanato-isocyanurates are based in the presence of the plasticizers as solvents or with subsequent dissolution of the isocyanato-isocyanurates in these plasticizers, and to the use of the solutions as adhesion-improving additives for coating compositions based on plasticized polyvinyl chloride.

2. Description of the Prior Art

In the coating of organic substrates, particularly substrates containing isocyanate-reactive groups, with melts of flexible PVC or PVC plastisols, the bond strength of the coatings often fails to meet practical requirements. Because of this, so-called adhesion promoters are used for improving adhesion (cf. Beschichten mit Kunststoffen, Carl Hanser Verlag, Munich, 1967 and Kunststoffe 68 (1978), pages 735 et seq., pages 800 et seq.).

Adhesion promoters ideally suited to this purpose are, for example, the solutions of isocyanato-isocyanurates in plasticizers for PVC which are described in German Auslegeschrift No. 2,419,016.

However, these known adhesion promoters still do not entirely satisfy practical requirements. In particular, where the known adhesion promoters are used, undesirable discoloration often occurs at the temperatures at which the PVC plastisols have to be processed (140° to 210° C.). This discoloration is not observed in the case of products which are free from adhesion promoters. In addition, there is a need for one-component adhesion promoters with which it is possible to produce PVC plastisols containing adhesion-promoting additives which are characterized by an increased pot life by comparison with the plastisols containing known adhesion promoters.

Accordingly, an object of the present invention is to provide new adhesion promoters for PVC plastisols with which it is possible to produce PVC plastisols containing adhesion promoters and distinguished by an increased pot life and which, in addition, are substantially color-stable during the production of the coating at temperatures in the range of from about 140° to 210° C.

Surprisingly, this object is achieved by the solutions of isocyanato-isocyanurates according to the invention which are described in more detail in the following. This is surprising because neither the replacement of the tolylene diisocyanate preferably used in accordance with German Auslegeschrift No. 2,419,016 by the 4,4'-diisocyanato-diphenyl methane which is mentioned in column 2, line 60 of the above-mentioned prior publication, nor the trimerization of mixtures of diisocyanates and monoisocyanates which is also recommended in the prior publication is suitable for achieving the object in question. Isocyanato-isocyanurates based on 4,4'-diisocyanato-diphenyl methane show only limited solubility in the plasticizers normally used for PVC and often precipitate from the solutions in the form of crystals. In addition, the solutions of isocyanato-isocyanurates based on 4,4'-diisocyanato-diphenyl methane show very high viscosities in the usual processing concentrations, so that they are largely unsuitable for this reason as well. The trimerization of mixtures of monoisocyanates and diisocyanates which is recommended in German Auslegeschrift No. 2,419,016 gives isocyanato-isocyanurates characterized by a drastically reduced NCO-functionality which is reflected in poorer bond strength of the coatings.

SUMMARY OF THE INVENTION

The present invention provides solutions of isocyanato-isocyanurates in plasticizers for polyvinyl chloride which are characterized by a content of from about 1 to 50% by weight of compounds corresponding to the following idealized formula:

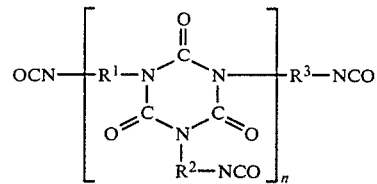

in which $R^1$, $R^2$ and $R^3$ are the same or different and represent (i) difunctional aromatic hydrocarbon radicals, of the type obtained by removing the isocyanate groups from 2,4- and/or 2,6-diisocyanato-toluene, or (ii) difunctional aromatic hydrocarbon radicals, of the type obtained by removing the isocyanate groups from 2,2'-, 2,4'- and/or 4,4'- diisocyanato-diphenyl methane, with the proviso that at least about 25 mole percent and at most about 83 mole percent of the radicals correspond to definition (i), and n is an integer or a fraction (as a statistical average) of from about 1 to 10.

The present invention also provides a process for producing solutions of the type in question which is characterized in that the isocyanate groups in mixtures of (i) 2,4-diisocyanato-toluene and, optionally, 2,6-diisocyanato-toluene and (ii) 4,4'-diisocyanato-diphenyl methane and, optionally, 2,4'-and/or 2,2'-diisocyanato-diphenyl methane in a molar ratio of (i): (ii) of from about 5:1 to 1:3 are partly trimerized in known manner by means of catalysts which accelerate the trimerization of isocyanate groups, the trimerization reaction either being carried out in the presence of plasticizers for polyvinyl chloride as solvents or the reaction product being dissolved in a plasticizer of this type, optionally after the separation of excess, unreacted starting diisocyanate.

Finally, the present invention also relates to the use of the solutions according to the invention as adhesion-improving additives for coating compositions based on plasticized polyvinyl chloride.

DETAILED DESCRIPTION OF THE INVENTION

The above formula for the compounds present in the solutions according to the invention is merely an "idealized" formula, because it must be assumed that, in addition to tris-isocyanato-monoisocyanurates (n=1) and their linear homologs (n>1) which contain at least one isocyanato-aryl radical on each isocyanurate ring, the solutions also contain branched NCO-substituted polyisocyanurates containing isocyanurate rings without any isocyanato-aryl substituent.

Starting materials for the process according to the invention are binary mixtures of (i) diisocyanato-toluene isomers and (ii) diisocyanato-diphenyl methane isomers.

The diisocyanato-toluene isomers (i) are 2,4-diisocyanato-toluene or mixtures thereof with up to about 35% by weight, based on the mixture as a whole, of 2,6-diisocyanato-toluene. It is particularly preferred to use 2,4-diisocyanato-toluene (TDI 100) and mixtures thereof with about 20% by weight (TDI 80) or about 35% by weight (TDI 65), based in each case on the mixture as a whole, of 2,6-diisocyanato-toluene. The diisocyanato-diphenyl methane isomers (ii) are 4,4'-diisocyanato-diphenyl methane or mixtures thereof with 2,4'-diisocyanato-diphenyl methane in a ratio by weight of from about 80:20 to 20:80, which mixtures may also contain minor quantities (from about 0 to 5% by weight, based on the mixture as a whole) of 2,2'-diisocyanato-diphenyl methane.

Isomer mixtures of this type are preferred to pure 4,4'-diisocyanato-diphenyl methane as component (ii). The particularly preferred component (ii) is a mixture of approximately 60% by weight of 2,4'- and approximately 40% by weight of 4,4'-diisocyanato-diphenyl methane, which may also contain minor quantities (from about 0 to 5% by weight, based on the mixture as a whole) of 2,2'-diisocyanato-diphenyl methane. The nature of the radicals $R^1$, $R^2$ and $R^3$ present in the products corresponding to the above general formula obtained by the process according to the invention naturally corresponds to the nature of the starting diisocyanates.

Components (i) and (ii) are used in a molar ratio of from about 5:1 to 1:3 and preferably in a molar ratio of from about 3:1 to 1:3 in the mixtures used in the process according to the invention.

The plasticizers for polyvinyl chloride which are present as solvents are the liquids normally used for this application, particularly esters which have a boiling point of at least about 250° C. under normal pressure or which cannot be distilled under normal pressure and which are preferably liquid at room temperature, being based on (a) alkane sulfonic acids containing from 9 to 20 carbon atoms, fatty acids containing from 12 to 18 carbon atoms, alkane dicarboxylic acids containing from 6 to 10 carbon atoms, aromatic dicarboxylic or polycarboxylic acids containing from 8 to 10 carbon atoms, the carboxyl groups being included in the addition of the carbon atoms, or phosphoric acid, and (b) monohydric aliphatic alcohols containing from 1 to 13 and preferably from 4 to 10 carbon atoms and having a linear or branched carbon chain, phenols containing from 6 to 20 and preferably 6 or 7 carbon atoms and/or araliphatic alcohols containing from 7 to 20 and preferably 7 or 8 carbon atoms, such as for example butyl benzyl phthalate, 2-ethyl-hexyl benzyl phthalate, tri-2-ethylhexyl phosphate, 2-ethylhexyl diphenyl phosphate, isodecyl diphenyl phosphate, tricresyl phosphate, cresyl diphenyl phosphate, tris-(nonyl phenyl)-phosphate, di-(2-ethylhexyl)-adipate, diisodecyl adipate, di-(2-ethylhexyl)-azelate, di-(2-ethylhexyl sebacate and tri-(2-ethylhexyl)-trimellitate.

The process according to the invention, i.e. trimerization of some of the isocyanate groups in the starting diisocyanates, is carried out in known manner using trimerization catalysts known per se. It is particularly advantageous to use Mannich bases of the type obtained by reacting (substituted) phenols with formaldehyde and dialkyl amines. Mannich bases suitable for use in the process according to the invention are described, for example, in U.S. Pat. No. 4,115,373, column 4, line 54 to column 7, line 4. However, in addition to these Mannich bases which it is preferred to use, any other trimerization catalysts known per se for isocyanate groups, such as for example phosphorous, arsenic and antimony bases, organometallic compounds, metal salts and hydroxides, particularly basic salts of alkali metals, tertiary amines, and any combinations of these catalysts, may also be used in the process according to the invention.

In the process according to the invention, the trimerization catalysts, particularly the preferred Mannich bases, are used in quantities of from about 0.001 to 5% by weight and preferably in quantities of from about 0.01 to 3% by weight, based on the diisocyanate mixture.

Trimerization may be carried out in the absence or presence of suitable inert solvents. Suitable solvents are, for example, low-boiling esters, such as ethyl acetate, butyl acetate, ethyl glycol acetate, chlorinated hydrocarbons, such as methylene chloride and, in particular, the plasticizers for PVC mentioned by way of example in the foregoing. Where the low-boiling solvents mentioned by way of example are used, they are removed, preferably by distillation, after the trimerization reaction, optionally together with excess unreacted diisocyanate, and the process products left as a residue are dissolved in the plasticizers for PVC mentioned by way of example above. Even where the process according to the invention is carried out in the absence of solvents, the process products are dissolved in the plasticizers mentioned by way of example, optionally after the separation of excess unreacted diisocyanate. In both these possible embodiments of the process according to the invention, the trimerization reaction is carried out at temperatures in the range of from about 40° to 140° C. and preferably at temperatures in the range of from about 60° to 120° C., trimerization being terminated by thermal decomposition of the catalyst or preferably by the addition of a catalyst poison before the particular degree of trimerization required has been reached.

In one preferred embodiment of the process according to the invention, trimerization is carried out in the presence of the plasticizers mentioned by way of example in the foregoing as solvents, the starting mixture of the diisocyanates being dissolved in the plasticizer either in a concentration which corresponds to the final concentration required or in a higher concentration, in which case the final concentration required is adjusted by the addition of more plasticizer before, during or after termination of the trimerization reaction. In this particularly preferred embodiment of the process according to the invention, the trimerization reaction is again carried out at temperatures in the ranges mentioned above and, with particular advantage, at temperatures in the range of from about 40° to 80° C. In practice, the catalyst is added, optionally in portions, to the solution of the mixture of starting diisocyanates in the plasticizer either at room temperature or at the intended reaction temperature and the reaction temperature is kept within the ranges mentioned either through the rate at which the catalyst is added or by external heating or cooling until the NCO-content of the mixture has fallen to at least half the initial value. The reaction is then terminated, preferably by the addition of a catalyst poison. However, trimerization should always be continued to such an extent that the diisocyanato-toluene content of the solutions according to the invention ultimately obtained is below about 0.5% by weight and preferably below about 0.3% by weight and the diisocyanato-diphenyl methane content below about 5% by weight and preferably below about 3% by weight.

In all embodiments of the process according to the invention, trimerization is preferably continued to such an extent that about 30% by weight solutions of the trimers in the plasticizers for PVC mentioned by way of example have an NCO-content of from about 3 to 7 and preferably from about 3 to 6% by weight. In all the embodiments of the process according to the invention, the plasticizer is used in such a quantity that solutions according to the invention having a solids content of from about 1 to 50% by weight and preferably from about 5 to 35% by weight are obtained as the end products of the process according to the invention.

Examples of suitable catalyst poisons for terminating the trimerization reaction are, for example, acids or acid derivatives such as, for example, perfluorobutane sulfonic acid, benzoic acid, benzoyl chloride or, where Mannich bases are used as catalysts, especially quaternizing agents, such as for example p-toluene sulfonic acid methyl ester. Thermal termination of the trimerization reaction is possible in the case of catalysts characterized by a relatively low decomposition temperature, such as for example the Mannich bases preferably used, and is carried out by briefly heating the reaction mixtures to temperatures of up to about 130° C. The advantage of thermal termination lies in the fact that there is no need to use chemical terminators or the quantities of chemical terminators used are reduced by comparison with the prior art, thus avoiding clouding in the products claimed by the process according to the invention.

The solutions according to the invention are clear liquids with little color of their own which show no tendency either towards crystallization or towards clouding or precipitation, even after storage for several weeks at very low temperatures. In addition, they are distinguished by a very small content of free TDI which is a particular advantage of the solutions according to the invention in view of the relatively low boiling point of this diisocyanate. The solutions according to the invention are suitable for use as adhesion promoters for flexible PVC and, in particular, as adhesion-promoting additives for PVC plastisols. The solutions according to the invention are used with particular advantage as adhesion promoters between substrates of man-made fibers containing NCO-reactive groups, such as for example, polyamide or polyester fibers, and PVC-plastisols or flexible PVC melts. The adhesion of flexible PVC or PVC plastisols to sheet-form substrates, i.e. films, may of course also be improved by means of the solutions according to the invention.

The solutions according to the invention may be used in accordance with the invention, for example, by printing, knife-coating, screen printing, spray-coating or dip-coating the solutions according to the invention onto the substrates to be coated. Depending on the type of article to be produced, one or more layers of PVC free from adhesion promoter are applied to the substrate surfaces thus pretreated, for example, in the form of plastisols or by extrusion or melt roll coating or by lamination. The solutions according to the invention may, of course, also be added to a PVC plastisol before its application.

In the latter case, a considerable advantage over known products is obtained where the products according to the invention are used. For reasons of operational reliability and uninterrupted operation, the complete PVC-plastisol compositions are required to undergo only a minimal increase in viscosity in systems of the kind in question. Hitherto known systems show considerable increases in viscosity after only a short time. By contrast, compositions containing the solutions according to the invention show only a slight increase in viscosity after several hours. This guarantees the required processing reserves.

The solutions according to the invention are normally used in such quantities that from about 0.5 to 200% by weight and preferably from about 2 to 30% by weight of isocyanato-isocyanurate are present, based on the weight of nonplasticized polyvinyl chloride in the coating composition. However, the solutions according to the invention may also be used in any other quantities adapted to the particular application.

Irrespective of the method of application, the production of the finished layers, i.e. the reaction of the NCO-groups in the adhesion promoter with the substrate and the gelation of the PVC-layer, is carried out in the usual way at elevated temperatures, temperatures in the range of from about 130° to 210° C. normally being applied according to the composition of the PVC-layers.

The thermal stability of the coatings produced with the solutions according to the invention is very good, i.e. the coatings gradually undergo only minimal discoloration, even after prolonged thermal stressing which is unavoidable under the conditions under which the layers are produced.

The solutions according to the invention are suitable for use as adhesion-improving additives for coatings based on plasticized PVC, particularly for the manufacture of tarpaulins, pavillions and other textile-based structures, flexible containers, awnings, marquees, protective clothing, conveyor belts, pile carpets or foam artificial leather. The solutions according to the invention are particularly suitable for use as adhesion-improving additives in the coating of substrates containing isocyanate-reactive groups, particularly in the coating of substrates based on man-made fibers containing isocyanate-reactive groups.

The invention is further illustrated by the following Examples in which all the percentages quoted represent percentages by weight. The abbreviations used have the following meanings:

TDI 100 = 2,4-diisocyanato-toluene
TDI 80 = a mixture of 80% of 2,4- and 20% of 2,6-diisocyanato-toluene
TDI 65 = a mixture of 65% of 2,4- and 35% of 2,6-diisocyanato-toluene
4,4'-MDI = diphenyl methane-4,4'-diisocyanate
2,4'-MDI = diphenyl methane-2,4'-diisocyanate
MDI 60 = an isomer mixture of approximately 60% of 2,4'-MDI and approximately 40% of 4,4'-MDI
DBP = dibutyl phthalate
DOP = di-(2-ethylhexyl)-phthalate
TOF = tri-(2-ethylhexyl)-phosphate The following catalysts were used in the following Examples:

Catalyst I: A Mannich base of phenol, formaldehyde and dimethylamine according to Example 1 of U.S. Pat. No. 4,115,373.

Catalyst II: A Mannich base of i-nonyl phenol, formaldehyde and dimethyl amine corresponding to Example 2 of U.S. Pat. No. 4,115,373.

EXAMPLE 1

A solution of 40 g (0.16 mole) of MDI 60 and 139.2 g (0.8 mole) of TDI 100 in 418 g of DOP is initially introduced at 50° C. After the addition of 0.8 ml of catalyst II, the temperature rises slowly to 58° C. and subsequently falls again. The mixture is kept at 50° C. by heating. After a total of 85 minutes, the solution has an NCO-content of 8.3%. Another 0.1 ml of catalyst II is then added and the temperature kept at 50° C. for another 65 minutes. The reaction is then interrupted by the addition of a terminator (1 ml of a solution of 1 part of perfluorobutane sulfonic acid in 2 parts of dimethyl formamide). The product obtained is a clear, colorless solution having an NCO-content of 6.0% and a viscosity of 3160 mPas (25° C.) which remains unchanged for several months. The free MDI-content amounts to 2.7% (sum of the isomers) and the free TDI-content to 0.21%.

EXAMPLE 2

1.1 ml of catalyst I are added at 50° C. to 100 g (0.4 mole) of MDI 60, 139.2 g (0.8 mole) of TDI 100 and 588 g of DBP, after which the temperature rises briefly to 60° C. The temperature is then kept at 50° C. for 5 hours, after which the reaction is terminated by the addition of 1 ml of a solution of perfluorobutane sulfonic acid in 2 ml of dimethyl formamide. The substantially colorless solution obtained has an NCO-content of 5.4% and a viscosity of 600 mPas (25° C.). The free diisocyanate contents amount to 1.9% (MDI) and 0.11% (TDI).

EXAMPLE 3

130 g (0.52 mole) of MDI 60 and 45.2 g (0.26 mole) of TDI 100 are trimerized with 0.75 ml of catalyst I in 409 g of DOP at 50° C. After a total of 265 minutes, the reaction is terminated by the addition of 1 ml of a perfluorobutane sulfonic acid solution (1:2 in dimethyl formamide). The clear, pale yellow solution has an NCO-content of 5.2% and a viscosity of 2200 mPas (25° C.). The diisocyanate contents amount to 2.6% (MDI) and <0.05% (TDI).

EXAMPLE 4

130 g (0.52 mole) of MDI 60 and 45.2 g (0.26 mole) of TDI 100 are trimerized with 0.75 ml of catalyst II at 50° C. in 409 g of a standard commercial plasticizer, consisting essentially of a mixture of alkane sulfonic acid phenyl esters containing from 10 to 18 carbon atoms in the alkane residue, until the mixture has an NCO-content of 5.4% (approximately 3 hours). 1 ml of a solution of 1 part of perfluorobutane sulfonic acid in 2 parts of dimethyl formamide is then added, after which the solution is kept at 80° C. for 35 minutes. The pale yellow solution has an NCO-content of 5.2% and a viscosity of 2450 mPas (25° C.)

EXAMPLE 5

The same test as in Example 4 is repeated with benzyl butyl phthalate as solvent. A yellow solution having an NCO-content of 5.3% and a viscosity of 1750 mPas (25° C.) is obtained.

EXAMPLE 6

The repetition of Example 4 with TOF as solvent gives a pale yellow solution having an NCO-content of 5.4% and a viscosity of 190 mPas (25° C.).

EXAMPLE 7

125 g (0.72 mole) of TDI 80 and 60 g (0.24 mole) of MDI 60 are dissolved in 432 g of DOP, followed by the addition at 50° C. of 1.2 ml of the catalyst II. After a brief temperature maximum (60° C.), the temperature is kept at 50° C. Another 2.4 ml of catalyst are added over a total period of 4 hours, after which 10 g of p-toluene sulfonic acid methyl ester are introduced and the mixture is stirred for 30 minutes at 80° C. The clear, substantially colorless solution obtained has an NCO-content of 5.0% and a viscosity of 13100 mPas. The diisocyanate contents amount to 1.1% (MDI) and 0.27% (TDI).

EXAMPLE 8

450 g (2.6 moles) of TDI 80 and 324 g (1.3 moles) of MDI 60 are introduced under nitrogen at 80° C. into 1806 g of DOP, followed by the addition of 9 ml of catalyst II. After a brief increase in temperature to 85° C., the temperature is kept at 80° C. After a total of 3 hours, the NCO-content amounts to 5.6%. After the addition of another 1 ml of catalyst, the mixture is kept at 80° C. for another 80 minutes, subsequently heated to 100° C. and kept at that temperature for 1.5 hours. A stable, pale yellow solution is obtained after cooling to room temperature, having an NCO-content of 4.6%, a viscosity of 29500 mPas and a free diisocyanate content of 0.3% (MDI) and 0.1% (TDI).

EXAMPLE 9

100 g (0.575 mole) of TDI 80 and 72 g (0.29 mole) of MDI 60 are introduced into 516 g of DOP, followed by the addition at 77° C. of 3.5 ml of catalyst II. The temperature rises to 85° C. and is then kept at 80° C. After a total of 255 minutes, the mixture is heated for 1 hour to 100° C. After cooling to 80° C., 6.3 g of p-toluene sulfonic acid methyl ester are added and the temperature is kept at 80° C. for another hour. The clear, substantially colorless solution obtained has an NCO-content of 3.9%, a viscosity of 9700 mPas (25° C.), an MDI content of 1.6% and a TDI content of 0.16%.

EXAMPLE 10

69.6 g (0.4 mole) of TDI 80 and 100 g (0.4 mole) of MDI 60 are trimerized with 3 ml of catalyst II in 396 g of DOP in the same way as described in Example 9 and similarly treated with 5.4 g of p-toluene sulfonic acid methyl ester. The solution obtained has an NCO-content of 4.6%, a viscosity of 25300 mPas (25° C.) and contains 2.9% of MDI and 0.2% of TDI.

EXAMPLE 11

5.5 ml of catalyst II are added at 80° C. to 139.2 g (0.8 mole) of TDI 80 and 200 g (0.8 mole) of MDI 60 in 339 g of DOP. The temperature rises briefly to 90° C. and is then kept at 80° C. After a total of 1 hour, the mixture is heated for 90 minutes to 100° C., diluted at that temperature with 678 g of DOP having a temperature of 23° C., 11 g of p-toluene sulfonic acid methyl ester are added at 80° C. and the mixture is stirred for another hour at 80° C. The substantially colorless solution has an NCO-content of 3.5%, a viscosity of 4650 mPas (25° C.) and contains 1.3% of MDI and 0.12% of TDI.

EXAMPLE 12

150 g (0.86 mole) of TDI 65 and 108 g (0.43 mole) of MDI 60 are trimerized with a total of 3.6 ml of catalyst I at 50° C. in 602 g of DOP until the mixture has an NCO-content of 4.9%. After the addition of 9 g of p-toluene sulfonic acid methyl ester, the mixture is stirred for 30 minutes at 80° C. The solution contains 4.8% of NCO, 2.6% of MDI and 0.26% of TDI and has a viscosity of 17700 mPas (25° C.).

EXAMPLE 13

100 g (0.57 mole) of TDI 100 and 72 g (0.29 mole) of 4,4'-MDI are trimerized for 45 minutes with 0.75 ml of catalyst II at 50° C. in 401 g of DBP, after which the reaction is terminated by the addition of 1 ml of a solution of 1 part of perfluorobutane sulfonic acid and 2 parts of dimethyl formamide. The colorless solution obtained has an NCO-content of 6.4% and a viscosity of 260 mPas (25° C.) and retains its low viscosity for several months without showing any signs of precipitation or clouding.

EXAMPLE 14

139.5 g (0.8 mole) of TDI 80 and 50 g (0.2 mole) of 4,4'-MDI are trimerized with a total of 1.8 ml of catalyst II at 50°–55° C. in 441 g of DOP. After 3 hours, 5 g of p-toluene sulfonic acid methyl ester are added to the mixture which is then stirred for 30 minutes at 80° C. The clear, colorless solution obtained has an NCO-content of 5.5%, an MDI content of 1.2%, a TDI content of 0.2% and a viscosity of 3700 mPas which does not change in storage over weeks.

EXAMPLE 15 (COMPARISON)

330 g (1.32 moles) of MDI 60 are trimerized with 1.6 ml of catalyst II in 770 g of DBP at 50° C. After 315 minutes, 6.5 g of p-toluene sulfonic acid methyl ester are added, followed by stirring for 30 minutes at 80° C. The yellow solution has an NCO-content of 3.7%. The viscosity amounts to 3800 mPas (25° C.) and is thus distinctly higher than that of the products according to the invention using the same plasticizer (Examples 2, 13).

EXAMPLE 16 (COMPARISON)

150 g (0.6 mole) of 4,4'-MDI are trimerized with 0.7 ml of catalyst II at 50° C. in 350 g of DOP. After 165 minutes, the reaction is terminated by the addition of 1 ml of a solution of 1 part of perfluorobutane sulfonic acid and 2 parts of dimethyl formamide. The solution which has an NCO-content of 4.8% actually begins to cloud heavily on cooling.

EXAMPLE 17 (COMPARISON)

130 g (0.75 mole) of TDI 65 are trimerized with a total of 2.2 ml of catalyst II at 50° C. in 390 g of DOP. After a total of 370 minutes, the reaction is terminated by the addition of 1 ml of a solution of 1 ml of perfluorobutane sulfonic acid in 2 ml of dimethyl formamide. A clear solution having an NCO-content of 3.8% and a viscosity of 9020 mPas (25° C.) is obtained.

EXAMPLE 18

This Example demonstrates the technical advantages which are obtained in the processing of a solution according to the invention by comparison with the solution according to Example 17.

(a) Production of the PVC-plastisol 1000 g of PVC, paste type, K-value = 74 according to DIN 53726, are homogeneously ground twice on a three-roll stand with 700 g of DOP and 24 g of barium cadmium laurate (in the form of a 50% paste in DOP). The PVC plastisol thus obtained is then aged for 24 hours at 20° C. until it is used for the following tests.

(b) Viscosity at 20° C. in dependence upon the storage time (pot life)

40 g of the 25% trimer solution according to Example 17 are added to and homogeneously stirred with 800 g of the PVC-plastisol described above.

In a second experiment, 40 g of the 25% solution in DOP according to the invention (Example 11) are added to and again homogeneously mixed with 800 g of the PVC-plastisol.

The viscosity behavior of both PVC-plastisols is measured at 20° C. in dependence upon the storage time using a Haake/Berlin rotary viscometer (measuring element MV III) at a shear velocity (D) of 8.0 $S^{-1}$. The results obtained are set out in Table 1 below in which both the measured viscosities and also the differences in relation to the intitial viscosity (in mPas and in %, based on the initial viscosity) are shown as a function of time.

TABLE 1

| | Viscosity behavior at 20° C. in dependence upon the storage time (pot life) | | | | | | | | |
|---|---|---|---|---|---|---|---|---|---|
| | Initial viscosity | After 7 hours | Increase in viscosity | | After 24 hours | Increase in viscosity | | After 30 hours | Increase in viscosity | |
| PVC-plastisol | mPas | mPas | mPas | % | mPas | mPas | % | mPas | mPas | % |
| Comparison | 22675 | 26609 | 3934 | 17.3 | 38480 | 15805 | 69.7 | 42814 | 20139 | 88.8 |
| According to the invention | 14872 | 15272 | 400 | 2.7 | 19806 | 4934 | 33.1 | 22541 | 7669 | 51.6 |

EXAMPLE 19

This Example demonstrates the high bond strength of PVC coatings produced with solutions according to the invention.

A PVC-plastisol is produced from 300 g of PVC, paste type (K-value 70 according to DIN 53726)
300 g of PVC, paste type (K-value 80 according to DIN 53726)
400 g of $C_{10}$–$C_{18}$-alkane sulfonic acid phenyl ester
60 g of kaolin
20 g of dibasic lead phosphite
10 g of chromium oxide green.

A homogeneous PVC-plastisol is obtained by grinding twice on a three-roll stand and is subsequently aged for 24 hours at 20° C.

Quantities of 5 g of the individual solutions of the isocyanato-isocyanurates are added to and homogeneously stirred with 100 g of the PVC-plastisol thus produced. The individual mixtures are then applied in a quantity of 100 g/m² to test fabrics of polyester (1100 dtex, weave L 1/1, setting 9/9 Fl/cm) and polyamide-6,6 (940 dtex, weave L 1/1, setting 8.5/9.5 Fl/cm) using a coating knife, followed by gelation for 1 minute at 140° C. in a recirculating air drying cabinet heated with hot air. A top coat of the PVC-plastisol without any isocyanato-isocyanurate is then applied to this bottom layer, again using a coating knife, and the whole is gelled at 180° C. in a recirculating air drying cabinet. Bond strength is then measured on 5 cm wide test specimens punched out of the coating (DIN 53357). The individual bond strengths are shown in Table 2.

It can clearly be seen that, with all the solutions according to the invention, considerably improved bond strengths are obtained both on polyester and also on polyamide-6,6 compared with the case of the Comparison Example without any addition.

TABLE 2

| Additions to 100 g of PVC-plastisol of Example 3 | Bond Strength (N/5 cm) on Polyester 1100 dtex | Polyamide-6,6 940 dtex |
|---|---|---|
| no addition | 45 | 35 |
| + 5 g of the product of Example 17 | 180 | 205 |
| + 3 g of the product of Example 3 | 150 | 195 |
| + 4 g of the product of Example 3 | 170 | 205 |
| + 5 g of the product of Example 3 | 175 | 200 |
| + 3 g of the product of Example 4 | 150 | 190 |
| + 4 g of the product of Example 4 | 155 | 195 |
| + 5 g of the product of Example 4 | 165 | 200 |
| + 3 g of the product of Example 11 | 170 | 200 |
| + 4 g of the product of Example 11 | 190 | 210 |
| + 5 g of the product of Example 11 | 200 | 225 |
| + 5 g of the product of Example 10 | 175 | 225 |
| + 5 g of the product of Example 8 | 190 | 210 |
| + 5 g of the product of Example 9 | 200 | 205 |

EXAMPLE 20

This Example shows the surprising extent to which thermal stability is improved in relation to the prior art by using products according to the invention.

555 g of PVC, paste type, K-value=74 (according to DIN 53726)
397 g of DOP
16 g of epoxidized soya bean oil
16 g of barium-cadmium-zinc stabilizer, liquid
16 g of titanium dioxide The components of the formulation are homogeneously ground twice on a three-roll stand and aged for 24 hours at 20° C.

For sample preparation, quantities of 5 g of the individual solutions are added to and homogeneously stirred with 100 g of the PVC-plastisol described above. 0.5 mm thick layers of these individual mixtures are applied to siliconized paper and then gelled for 3 minutes in a recirculating air drying cabinet heated with hot air at 170° C. After cooling, the films are separated from the paper. The thermal stability of the films is tested at 180° C. in a Mathis Thermotester (Mathis AG, Zurich). Samples are automatically ejected at intervals of 10 minutes. The effect of heat is reflected in the discoloration. The amount of time which elapses until just before the samples turn brown in color is a measure of the thermal stability.

Table 3 compares the thermal stability values obtained where the various solutions are used.

TABLE 3

| Addition to 100 g of PVC-plastisol | Thermal stability (x) in minutes, as measured at 180° C. in a Mathis Thermotester |
|---|---|
| no addition (thermal stability of the PVC-plastisol) | 40' < (x) < 50' |
| + 5 g of the solution of Example 17 | 10' < (x) << 20' |
| + 5 g of the solution of Example 4 | 40' < (x) < 50' |
| + 5 g of the solution of Example 3 | 40' < (x) < 50' |
| + 5 g of the solution of Example 11 | 30' < (x) < 40' |
| + 6 g of the solution of Example 11 | 30' < (x) < 40' |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solution of isocyanato-isocyanurates in a plasticizer for polyvinyl chloride, characterized by a content of from about 1 to 50% by weight of compounds corresponding to the following idealized formula:

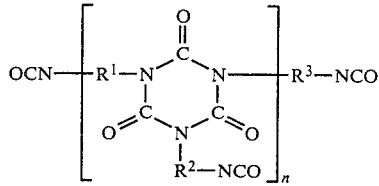

in which

R¹, R² and R³ are the same or different and represent (i) difunctional aromatic hydrocarbon radicals of the type obtained by removing the isocyanate groups from 2,4-and/or 2,6-diisocyanato-toluene or (ii) difunctional aromatic hydrocarbon radicals of the type obtained by removing the isocyanate groups from 2,2'-, 2,4'- and/or 4,4'-diisocyanato-diphenyl methane, with the proviso that at least about 25 mole percent and at most about 83 mole percent of the radicals correspond to definition (i), and n is an integer or a fraction (as a statistical average) of from about 1 to 10.

2. The solution as claimed in claim 1, characterized in that from about 0 to 35 mole percent of the radicals (i) consist of radicals obtained by removing the isocyanate groups from 2,6-diisocyanato-toluene and from about 100 to 65 mole percent consist of radicals obtained by removing the isocyanate groups from 2,4-diisocyanato-toluene, and in that from about 20 to 80 mole percent of the radicals (ii) consist of radicals obtained by removing the isocyanate groups from 2,4'-diisocyanato-diphenyl methane, from about 80 to 20 mole percent consist of radicals obtained by removing the isocyanate groups from 4,4'-diisocyanato-diphenyl methane and about 0 to 5 mole percent consist of radicals obtained by removing the isocyanate groups from 2,2'-diisocyanato-diphenyl methane.

3. A process for producing the solution claimed in claim 1, characterized in that the isocyanate groups of mixtures of (i) 2,4'-diisocyanato-toluene and, optionally, 2,6-diisocyanato-toluene and (ii) 4,4'-diisocyanato-diphenyl methane and, optionally, 2,4'- and/or 2,2'-diisocyanato-diphenyl methane in a molar ratio of (i):(ii)

of from about 5:1 to 1:3 are partly trimerized using catalysts which accelerate the trimerization of isocyanate groups, the trimerization reaction either being carried out in the presence of plasticizers for polyvinyl chloride as solvents or the reaction product being dissolved in a plasticizer of this type, optionally after the separation of excess, unreacted starting diisocyanate.

4. The process as claimed in claim 3, characterized in that the mixtures used are those of which component (i) consists of 2,4- and 2,6-diisocyanato-toluene in a molar ratio of from about 100:0 to 65:35 and of which component (ii) consists of 4,4'- and 2,4'-diisocyanato-diphenyl methane in a molar ratio of from about 80:20 to 20:80 and, optionally, minor quantities of 2,2'-diisocyanato-diphenyl methane.

5. A coating composition which comprises
(a) polyvinyl chloride, and
(b) the solution of claim 1 or 2.

* * * * *